United States Patent
Povolny

(10) Patent No.: US 10,693,805 B2
(45) Date of Patent: Jun. 23, 2020

(54) TRACKING COSTS FOR A DEPLOYABLE INSTANCE

(71) Applicant: Red Hat, Inc., Raleigh, NC (US)

(72) Inventor: Martin Povolny, Herspice (CZ)

(73) Assignee: Red Hat, Inc., Raleigh, NC (US)

( * ) Notice: Subject to any disclaimer, the term of this patent is extended or adjusted under 35 U.S.C. 154(b) by 362 days.

(21) Appl. No.: 14/011,432

(22) Filed: Aug. 27, 2013

(65) Prior Publication Data

US 2015/0067169 A1 Mar. 5, 2015

(51) Int. Cl.

| | |
|---|---|
| *G06F 15/173* | (2006.01) |
| *H04L 12/911* | (2013.01) |
| *H04L 12/24* | (2006.01) |
| *H04N 21/462* | (2011.01) |
| *H04L 12/14* | (2006.01) |
| *G06Q 30/06* | (2012.01) |

(52) U.S. Cl.
CPC ........ *H04L 47/781* (2013.01); *H04L 41/5051* (2013.01); *G06Q 30/0611* (2013.01); *H04L 12/1421* (2013.01); *H04L 41/5096* (2013.01); *H04N 21/4622* (2013.01)

(58) Field of Classification Search
CPC ... H04L 41/00; H04L 41/781; H04L 41/5051; H04L 41/5096; H04L 47/781; G06F 3/122; G06F 3/1239; G06F 3/1276
See application file for complete search history.

(56) References Cited

U.S. PATENT DOCUMENTS

| | | | |
|---|---|---|---|
| 8,370,490 B2 | 2/2013 | Deng et al. | |
| 8,656,023 B1* | 2/2014 | Ho | G06F 9/5072 |
| | | | 709/203 |
| 9,325,791 B1* | 4/2016 | Blahaerath | H04L 67/1097 |
| 2009/0276771 A1* | 11/2009 | Nickolov | G06F 9/4856 |
| | | | 717/177 |

(Continued)

OTHER PUBLICATIONS

Lee Hutchinson "Why I pay extra for "business-class" broadband at home" Oct. 15, 2012 https://arstechnica.com/information-technology/2012/10/why-i-pay-extra-for-business-class-broadband-at-home/ pp. 3-4.*

(Continued)

*Primary Examiner* — Mohamed A. Wasel
*Assistant Examiner* — Rachel J Hackenberg
(74) *Attorney, Agent, or Firm* — Lowenstein Sandler LLP

(57) ABSTRACT

A system and method for receiving a request to launch a deployable instance, a resource requirement profile for the deployable instance, different cost model information for each cloud in a pool of clouds, and different capability information for each cloud in the pool of clouds. Selectable clouds in the pool of clouds that meet the resource requirement profile are determined, and a deployment cost is calculated for the deployable instance for each cloud in the pool of clouds based on the resource requirement profile and the cost information. A lowest cost cloud that corresponds to the resource requirement profile for launching the deployable instance is determined from the selectable clouds based on the deployment cost of each selectable cloud. Upon determining the lowest cost cloud that corresponds to the resource requirement profile, the deployable instance can be launched on the lowest cost cloud.

20 Claims, 5 Drawing Sheets

(56) References Cited

U.S. PATENT DOCUMENTS

| | | | |
|---|---|---|---|
| 2010/0036698 A1* | 2/2010 | Garrison | G06Q 20/20 |
| | | | 705/16 |
| 2011/0213884 A1* | 9/2011 | Ferris | G06F 9/5055 |
| | | | 709/226 |
| 2012/0131195 A1 | 5/2012 | Morgan et al. | |
| 2012/0303740 A1 | 11/2012 | Ferris | |
| 2012/0330700 A1 | 12/2012 | Garg et al. | |
| 2013/0067090 A1 | 3/2013 | Batrouni et al. | |
| 2013/0073731 A1 | 3/2013 | Bose et al. | |
| 2014/0280723 A1* | 9/2014 | Gokul | H04L 67/16 |
| | | | 709/217 |
| 2014/0280966 A1* | 9/2014 | Sapuram | G06Q 30/0631 |
| | | | 709/226 |

OTHER PUBLICATIONS

Bonde, Dhavel, "Techniques for Virtual Machine Placement in Clouds", Department of Computer Science and Engineering Indian Institute of Technology, Bombay Mumbai 2010, pp. 1-18.

Shankar, Anjana, "Virtual Machine Placement in Computing Clouds", Apr. 10, 2010, pp. 1-23.

Chaisiri, Sivadon, et al. Optimal Virtual Machine Placement Across Multiple Cloud Providers; in IEEE Asia-Pacific Service Computing Conference (APSCC) Singapore, Dec. 7-11, 2009.

Chaisiri, Sivadon et al., "Optimal Virtual Machine Placement Across Multiple Cloud Providers" Presented in IEEE Asia-Pacific Service Computing Conference (APSCC) Singapore, Dec. 8, 2009.

* cited by examiner

TRACKING COSTS FOR A DEPLOYABLE INSTANCE

Embodiments of the present disclosure relate to cloud computing and, more particularly, to a technique of cloud provider selection.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. However, a variety of factors may impact which cloud provider would be most desirable for a particular set of virtual machines.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Embodiments of the disclosure are directed to a method and system for tracking costs for a deployable instance. In one embodiment, a server computer system receives a request to launch a deployable instance along with a resource requirement profile for the deployable instance. The server computer system also receives different cost information and different capability information for each cloud in a pool of available clouds. The server computer system calculates a deployment cost for the deployable instance for each cloud based on the resource requirement profile and determines the clouds that meet the resource requirement profile. A lowest cost cloud for launching the deployable instance that meets the resource requirement profile is determined based on the deployment costs for each cloud, and, upon determining the lowest cost cloud that meets the resource requirement profile, the deployable instance is launched on the lowest cost cloud.

In one embodiment, upon determining that none of the clouds in the pool of clouds meet the resource requirement profile of the deployable instance, clouds in the pool of clouds that meet at least a portion of the resource requirement profile are determined. A lowest cost cloud for launching the deployable instance from the clouds that meets at least a portion of the resource requirement profile is determined based on the deployment costs for each cloud. Upon determining a lowest cost cloud that meets the at least a portion of the resource requirement profile, the deployable instance is launched on the lowest cost cloud that meets the at least a portion of the resource requirement profile. The portion of the resource requirement profile can be a minimum resource requirement profile.

The cost information can be based on one or more chargeables, and the chargeables can be a unit of run time, a unit of usage of bandwidth, a unit of usage of storage, a unit of usage of IP assignment, a backup, a load balancer, and a database access. In one embodiment, the chargeables of a first cloud in the pool of clouds are different from the chargeables of a second cloud in the pool of clouds. The computer server system can automatically receive cost information from each of the clouds in the pool of clouds.

According to one embodiment, deployable instances can be launched in a more cost effective manner while still achieving optimal performance because the least expensive cloud that meets the requirement for each deployable instance can be selected.

Figure 1:
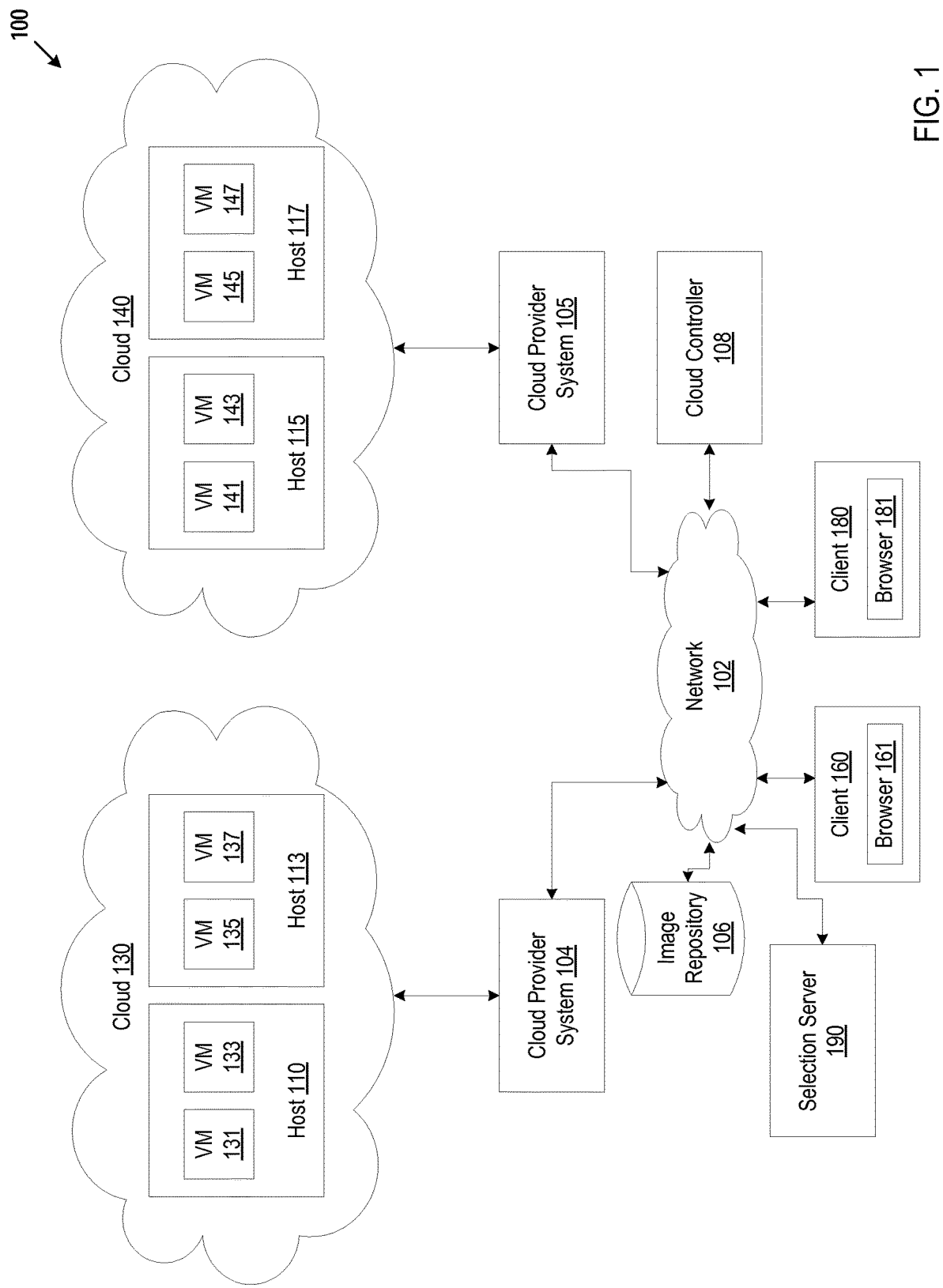
FIG. 1 illustrates exemplary system architecture, in accordance with various embodiments of the present disclosure.

FIG. 1 is a block diagram of a network architecture 100 for a distributed computing system, in which embodiments of the invention may operate. The network architecture 100 can include multiple clouds 130, 140 managed by various cloud provider systems 104, 105. There can be any number of clouds 130, 140 and cloud provider systems 114, 116. For brevity and simplicity, two clouds 130, 140 are used as an example throughout this document. In an embodiment, the network architecture includes clouds from multiple cloud providers or hosts. The clouds 130, 140 provide virtual machines. There can be any number of virtual machines in a cloud 130, 140. For brevity and simplicity, four virtual machines in each cloud 130, 140 are used as an example in architecture 100. For example, cloud 130, provides virtual machines 131, 133, 135, and 137, and cloud 140 provides virtual machines 141, 143, 145, and 147. Each virtual machine is hosted on a physical machine configured as part of the cloud 130, 140. Such physical machines are often located in a data center. For example, virtual machines 131 and 133 are hosted on host 110 in cloud 130 provided by cloud provider system 104, virtual machines 135 and 137 are hosted on host 113 in cloud 130 provided by cloud provider system 104, virtual machines 141 and 143 are hosted on host 115 in cloud 140 provided by cloud provider system 105, and virtual machines 145 and 147 are hosted on host 117 in cloud 140 provided by cloud provider system 105. The cloud provider systems 104, 105 and clouds 130, 140 may be provided as an infrastructure as a service (IaaS) layer. The cloud provider systems 104, 105 and clouds 130, 140 may be provided by, for example, a third party cloud provider or a private party. For example, cloud provider system 104 and cloud 130 may be provided by Cloud-Provider-1, and cloud provider system 105 and cloud 140 may be provided by Cloud-Provider-2. A cloud provider can provide more than one type of cloud provider system 104, 105 and more than one type of cloud 130, 140. The cloud provider can be an entity. An entity, as referred to here, can represent any person, a business organization such as a corporation, an educational institution such as a college or university, etc. Users can interact with applications executing on cloud-based virtual machines using client computer systems, such as clients 160, 180, via corresponding web browser programs 161, 181. Users may have one or more accounts associated with a cloud provider system 104, 105.

Clients 160, 180 are connected to hosts 110, 113, 115, 117 and the cloud provider system 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a cloud controller 108 and a selection server 190 via the network 102. The cloud controller 108 and selection server 190 may reside on the same machine or different machines (e.g., server computers, desktop computers, etc.). The cloud controller 108 and selection server 190 may be maintained by a cloud consumer of cloud 130, 140 such as an enterprise (e.g., business, company). In another embodiment, the cloud controller 108 and selection server 190 may be maintained by a third party cloud provider. In yet another embodiment, the cloud controller 108 and/or selection server 190 may be part of the cloud provider system 104, 105.

The cloud controller 108 may manage the execution of applications in the cloud 130, 140. The cloud controller 108 may receive input, for example, from a system administrator via a client 160, 180, describing VMs 131, 133, 135, 137, 141, 143, 145, 147 to be deployed in the cloud 130, 140 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 131, 133, 135, 137, 141, 143, 145, 147. In one embodiment, the cloud controller 108 generates the application deployment data based on the user input and stores the application deployment data in the image repository 106. The repository 106 may reside on the same machine as the cloud controller 108 or a different machine (coupled to the cloud controller 108 via network 102) and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, along with any software requirements, such as additional software packages to be installed, beyond the base operating system, additional configuration which may be required, for example, network ports on which services should be made available, and specific targeting information to instantiate a virtual machine, for example, a hardware profile, which specifies an amount of RAM, and a number of virtual CPUs. The application deployment data can be a hierarchy of data that includes deployables (i.e., deployable instances), assemblies, and templates. Each deployable instance describes an overview of one or more virtual machines to be deployed as a group. A deployable instance can describe any number of arbitrarily large and complex deployments of virtual machines or a small number of virtual machines. For brevity and simplicity, a deployable instance of four virtual machines is used as an example in architecture 100. A deployable instance can be described by an XML file.

An assembly is a description of a virtual machine to be deployed. An assembly can be described by an XML file. An assembly can include the description of a service to be provided by a virtual machine, the description of a service to be used by a virtual machine, and the description of one or more parameter values to be provided to or relied upon by a virtual machine. The following is an example of a deployable definition, including assemblies:

```
<?xml version="1.0"?>
<deployable version="1.0" name="test">
<description/>
<assemblies>
<assembly hwp="small-x86_64" name="test1">
<image id="aeaeb15e-1eb3-11e2-b10e-52540028e9a5"/>
</assembly>
<assembly hwp="small-x86_64" name="test2">
<image id="aeaeb15e-1eb3-11e2-b10e-52540028e9a5"/>
</assembly>
<assembly hwp="small-x86_64" name="test3">
<image id="aeaeb15e-1eb3-11e2-b10e-52540028e9a5"/>
</assembly>
</assemblies>
</deployable>
```

A template is a description of a disk image and meta-data for creating a virtual machine image. A virtual machine image can be created based on a template. A virtual machine image can be launched to instantiate (create) a virtual machine in a cloud. A template can be described by an XML file. The following is an example of an image template:

```
<template>
<name>f15jeos</name>
<os>
<name>Fedora</name>
<version>15</version>
<arch>x86_64</arch>
<install type='url'>
<url>http://download.devel.redhat.com/released/F-
15/GOLD/Fedora/x86_64/os/</url>
</install>
<rootpw>test</rootpw>
</os>
<description>Fedora 15</description>
</template>
```

Upon receiving a command identifying a specific deployable instance to launch, the cloud provider system 104, 105 retrieves a reference to the existing image for each virtual machine available to be run/cloned on top of a hypervisor (not shown). If the image is not in the image repository 106, other elements may be used to place the image in the repository 106. The command may be received from the cloud controller 108 or a user (e.g., a system administrator) via a console computer or a client machine. The images can be launched in the cloud 130, 140 to instantiate the virtual machines 131, 133, 135, 137, 141, 143, 145, 147 for the deployable instance. Launch of a virtual machine can include powering on or booting a virtual machine.

The selection server 190 can detect the VMs 131, 133, 135, 137, 141, 143, 145, 147 that have been started (e.g., powered on or booted) for a deployable instance. The selection server 190 can communicate with agents running in the VMs and with the image repository 106 to retrieve application deployment data. In one embodiment, when a virtual machine image is launched (e.g., powered-on, booted) on a host in the cloud 130, 140 the agent can execute in a corresponding virtual machine to communicate with the selection server 190.

The selection server 190 receives a request to launch a deployable instance along with a resource requirement profile for the deployable instance. The resource requirement profile defines the cloud resources that are desired for the launch of the deployable instance, such as amount of memory, processing speed, performance, reliability, internal versus external cloud provider, provider type, provider capacity, and/or date/time of deployment. For example, the resource requirement profile can be defined in the application deployment data. The selection server 190 also receives different cost information and different capability information for each available cloud (e.g., cloud 130, 140). The selection server 190 calculates a deployment cost for the deployable instance for each available cloud based on the resource requirement profile and determines clouds that meet the resource requirement profile. The selection server 190 then determines a lowest cost cloud for launching the deployable instance that meets the resource requirement profile so that the deployable instance can be launched on this cloud.

Figure 2:
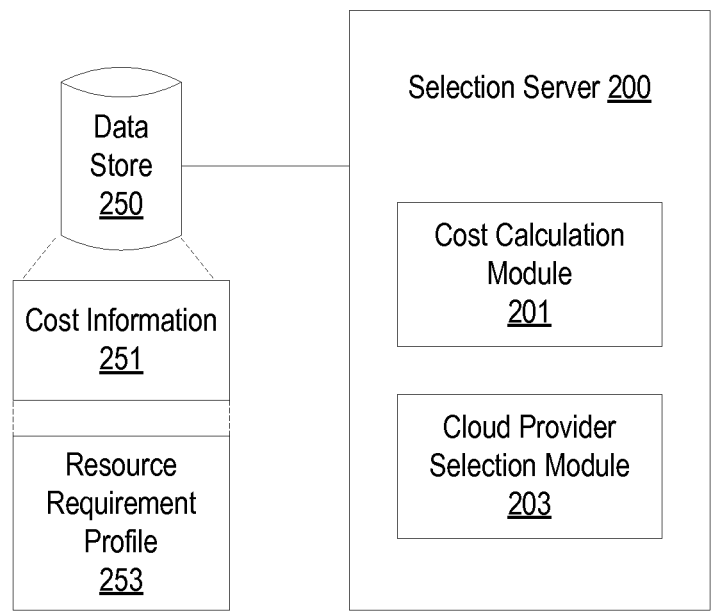
FIG. 2 is a block diagram of a selection server, in accordance with an embodiment.

FIG. 2 illustrates a block diagram of one embodiment of selection server 200. In one embodiment, the selection server 200 can be the same as the selection server 190 of FIG. 1. Selection server 200 includes a cost calculation module 201 and a cloud provider selection module 203. Note that in alternative embodiments, the selection server 200 may include more or less modules than those shown in FIG. 2. Also, the cost calculation module 201 and the cloud provider selection module 203 may be combined into a single module. Additionally, the functionality of either of the cost calculation module 201 and the cloud provider selection module 203 may be divided between multiple modules.

The selection server 200 determines a cloud for launching of a deployable instance, where the cost for launching the particular deployable instance is calculated for each available cloud that is suitable for launching the deployable instance, such that the lowest cost cloud capable of supporting the launch can be selected.

The cloud provider selection module 203 can determine which clouds meet the resource requirement profile for the deployable instance. In one embodiment, clouds that meet all of the requirements for a launch of a deployable instance are considered valid matches available for selection, where the requirements can be specified in a resource requirement profile 253. For example, these requirements can include a matching provider hardware profile (e.g., the cloud provider can launch virtual machines whose attributes, such as RAM and virtual CPUs, are a close approximation of the attributes requested by the launcher), a matching provider realm (e.g. the specified range of permissible environments in which the deployment could be launched includes at least some subcomponent of the hosting capacity presented by the cloud provider), images have been pushed (e.g., bootable machine images which correspond to the resource requirement profile that are already accessible to the cloud provider and available for immediate use), quota is not exceeded (e.g., a limit has been set by an administrator on the total amount of resources that the user who is requesting the deployment launch can consume has not been exceeded), etc.

Once the cloud provider selection module 203 determines which clouds meet the resource requirement profile, the cost calculation module 201 determines a cost for launching and running the deployable instance in each cloud in the pool of potential clouds. The cost for launching and running deployable instances can vary depending on the requirements (e.g., a particular resource requirement profile) for each particular deployable instance and the cost or billing structure of each particular cloud. For example, different resources in different clouds can have different charges associated with the resources (i.e., chargeables). In other words, different clouds can have different billing schemes. Chargeables for a particular cloud for use of cloud resources can include, but are not limited to, partial hour charges, whole hour charges, peak period charges, bandwidth charges, hardware profile charges, storage space charges, IP address assignment charges, and processor charges. Therefore, a particular deployable instance can have different costs in different clouds depending on the billing scheme and the resource requirement profile.

In one embodiment, the cost calculation module 201 receives cost information 251 (e.g., cost model information) for each potential cloud from data store 250. The cost information 251 can be entered into the data store 250 by a user, or the cost information 251 can be automatically entered into the data store 250 by a cloud provider. Further, the cost information 251 can be updated by the user or the cloud provider as costs change. The cost calculation module 201 also receives a resource requirement profile 253 (e.g., application deployment data) from the data store 250. Although the resource requirement profile 253 is shown as being stored in data store 250 here, the resource requirement profile 253 can be retrieved from other locations, such as image repository 106 shown in FIG. 1. The cost calculation module 201 then determines or calculates the cost of launching (and running) the deployable instance on each potential cloud based on the billing scheme of the cloud and the requirements of the deployable instance defined in the resource requirement profile.

In one example, a deployable instance requires 30 minutes of cloud time, 10 units of storage space, and one IP address assignment. Cloud A's billing scheme charges $1 per hour for cloud time where only whole hours can be purchased, and $2 per IP address assignment, but does not charge for storage space. Therefore, the total cost for this deployable on cloud A is $3. Cloud B's billing scheme charges $1 per hour for cloud time where partial hours can be purchased (i.e., cloud time can be prorated), and 10 cents per unit of storage space, but does not charge for IP address assignment. Therefore, the total cost for this deployable on cloud B is $1.50. Cloud C's billing scheme charges 1 cent per minute for cloud time, $1 per IP address assignment, and 50 cents per unit of storage space. Therefore, the total cost for this deployable on cloud C is $6.30.

In other embodiments, the cost of launching the deployable instance in each available cloud is determined first, and the selection server 200 determines which of the available clouds meet the resource requirement profile.

Once the cloud provider selection module 203 has determined which clouds in the pool of potential clouds meet all of the requirements specified in the resource requirement profile 253, the cloud provider selection module 203 can select the lowest cost cloud for launch of the deployable instance. Once the lowest cost cloud has been selected, the deployable instance can be launched on the lowest cost cloud.

In one embodiment, if none of the clouds in the pool of potential clouds meets all of the requirements specified in the resource requirement profile 253, then the cloud provider selection module 203 selects a cloud that is the best match at the lowest cost. In other words, the cloud provider selection module 203 considers both the capabilities of each cloud and the cost of each cloud to determine which cloud to select for the launch of the deployable instance. Here, the cloud provider selection module 203 may select a cloud that only meets a portion of the desired requirements specified in the resource requirement profile 253.

In one example, the user may define a subset of requirements (e.g., minimum requirements) for a deployable instance which will allow the deployable instance to be launched and run, but may not necessarily provide optimal (or desired) performance. In this example, the cloud provider selection module 203 determines which clouds in the pool of potential clouds meet the minimum requirements for the deployable instance. Once the cloud provider selection module 203 determines the clouds that meet the minimum requirements for the deployable instance, the cloud provider selection module 203 determines a lowest cost cloud from these clouds. The deployable instance can then be launched on the lowest cost cloud that meets the minimum requirements. Here, though the deployable instance may not function optimally, the deployable instance can still be launched.

In one embodiment, when it is determined that no matching cloud is available, then the user is informed that there is no suitable cloud available. For example, the user can be notified via a user interface, or, in the case of delayed launching, the user is notified through some other means, such as e-mail, SMS, or a social networking message. In another example, the notification that no suitable cloud is available can be displayed on the user interface the next time the user logs in.

In one embodiment, the resource requirement profile specifies ranking criteria (e.g., parameters such as cost, performance, reliability, internal versus external cloud provider, provider type, provider capacity, and/or date/time of deployment) from a user, e.g., an administrator, which can be stored in data store 250. The cloud provider selection module 203 can rank the clouds according to the ranking criteria to determine a priority ranking, which can be considered when determining the cloud selected for launching the deployable instance.

Figure 3:
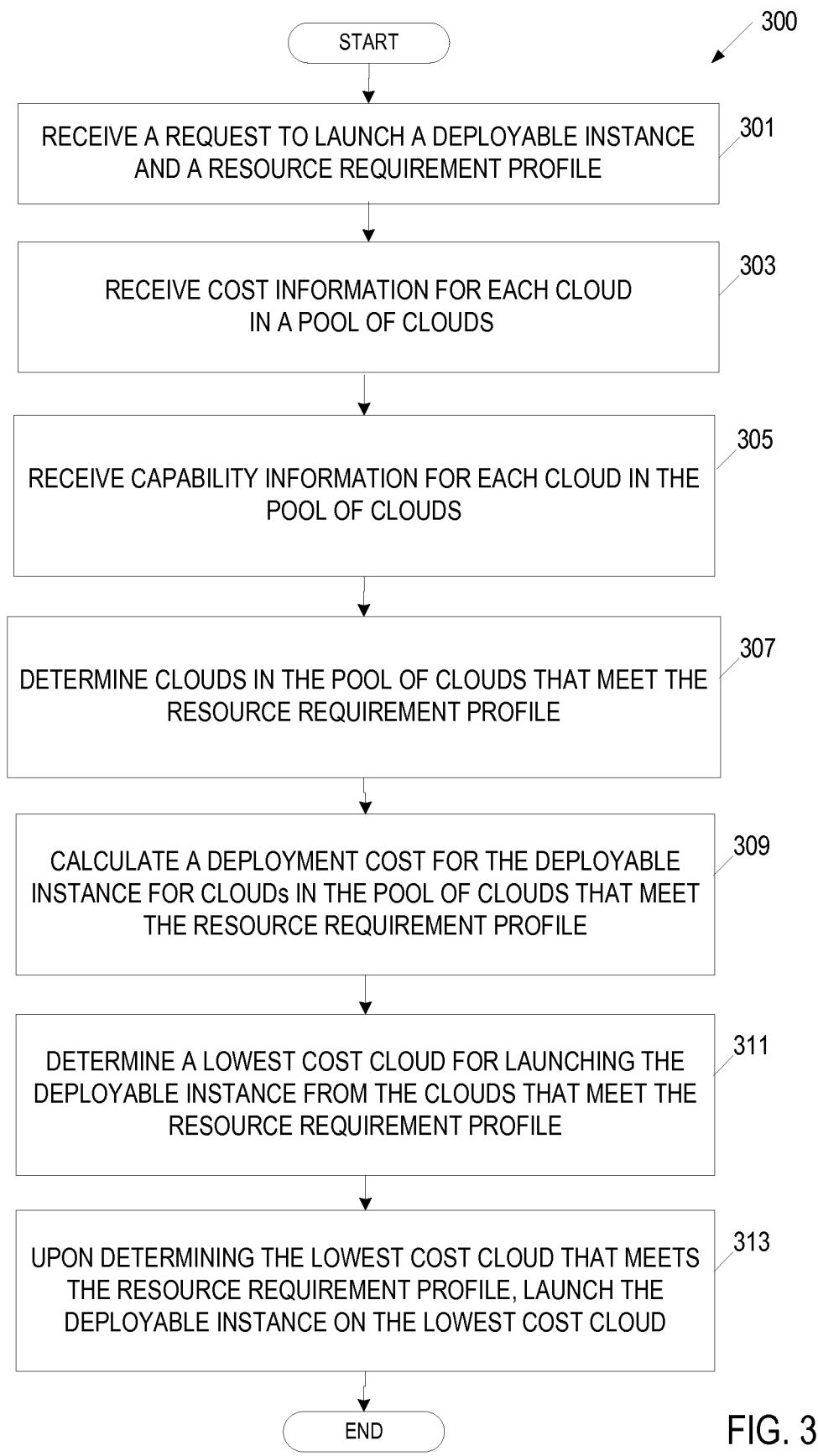
FIG. 3 is a flow diagram illustrating an embodiment of a method of cloud provider selection.

FIG. 3 is a flow diagram of an embodiment of a method 300 for cloud provider selection. The method 300 is performed by processing logic that may comprise hardware (circuitry, dedicated logic, etc.), software (such as is run on a general purpose computer system or a dedicated machine), or a combination of both. In one embodiment, the method 300 is performed by the selection server 200 of FIG. 2.

At block 301, a cloud controller receives a request to launch a deployable instance from a system administrator via a client, and requests the selection server to determine a cloud for the deployable instance. The selection server also receives a resource requirement profile including the required or desired resources for launch of the deployable instance. For example, the resource requirement profile can be retrieved from application deployment data, or a user or administrator can provide or modify a resource requirement profile that is received by the selection server.

At block 303, the selection server determines cost information for each cloud in a pool of potential clouds. The cost information can be stored in a data store when it is received from a user, an administrator, or a cloud provider. For example, cloud providers for each cloud can send billing scheme information (e.g., costs for chargeables) for storage in a data store that can be accessed by the selection server. Here, the cloud providers can update costs (e.g., automatically) as the costs change.

At block 305, the selection server receives capability information for each cloud in the pool of potential clouds. For example, this capability information can include the resources that each cloud can provide, such as performance, reliability, internal versus external cloud, cloud type, cloud capacity, and available features.

At block 307, the selection server determines the clouds in the pool of potential clouds that meet the resource requirement profile by analyzing the capability information received for each of the clouds. For example, if the deployable instance requires IP address assignments, but a particular cloud does not have the capability of providing IP address assignments, then this particular cloud does not meet the requirements in the resource requirement profile. However, if another cloud can meet all of the requirements in the resource requirement profile, then that cloud can be considered for launching the deployment instance.

At block 309, the selection server calculates a deployment cost for each cloud in the pool of potential clouds that meets the resource requirement profile based on the cost information and the resource requirement profile. For example, because different clouds have different billing schemes (e.g., chargeables), the cost of launching a particular deployable instance can vary between the different clouds due to the particular requirements of the deployable instance. In other words, while one cloud may have the lowest cost for one deployable instance, another cloud may have the lowest cost for another deployable instance with different requirements.

For example, chargeables for use of cloud resources can include partial hour charges, whole hour charges, peak period charges, bandwidth charges, hardware profile charges, storage space charges, IP address assignment charges, and processor charges. In one example for IP address assignment charges, IP address assignment charges may be high in a first cloud, low in a second cloud, and free in a third cloud. Therefore, a deployable instance that requires one or more IP address assignments may be more expensive to launch in the first cloud than in the third cloud.

At block 311, the selection server determines a lowest cost cloud that meets the resource requirement profile for launching the deployable instance. Once the selection server has determined all of the clouds that meet the resource requirement profile, the lowest cost cloud, based on the costs associated with resource requirement profile, can be selected. For example, the selection server can compare each of the clouds in the pool of potential clouds that meet the require requirement profile to determine what cloud has the lowest cost for the particular deployable instance.

In block 313, upon determining the lowest cost cloud that meets the resource requirement profile, the deployable instance can be launched on the lowest cost cloud that meets the deployable instance. As a result, the deployable instance can be launched in the most cost effective manner, while still achieving the desired result of getting the deployable instance launched.

Figure 4:
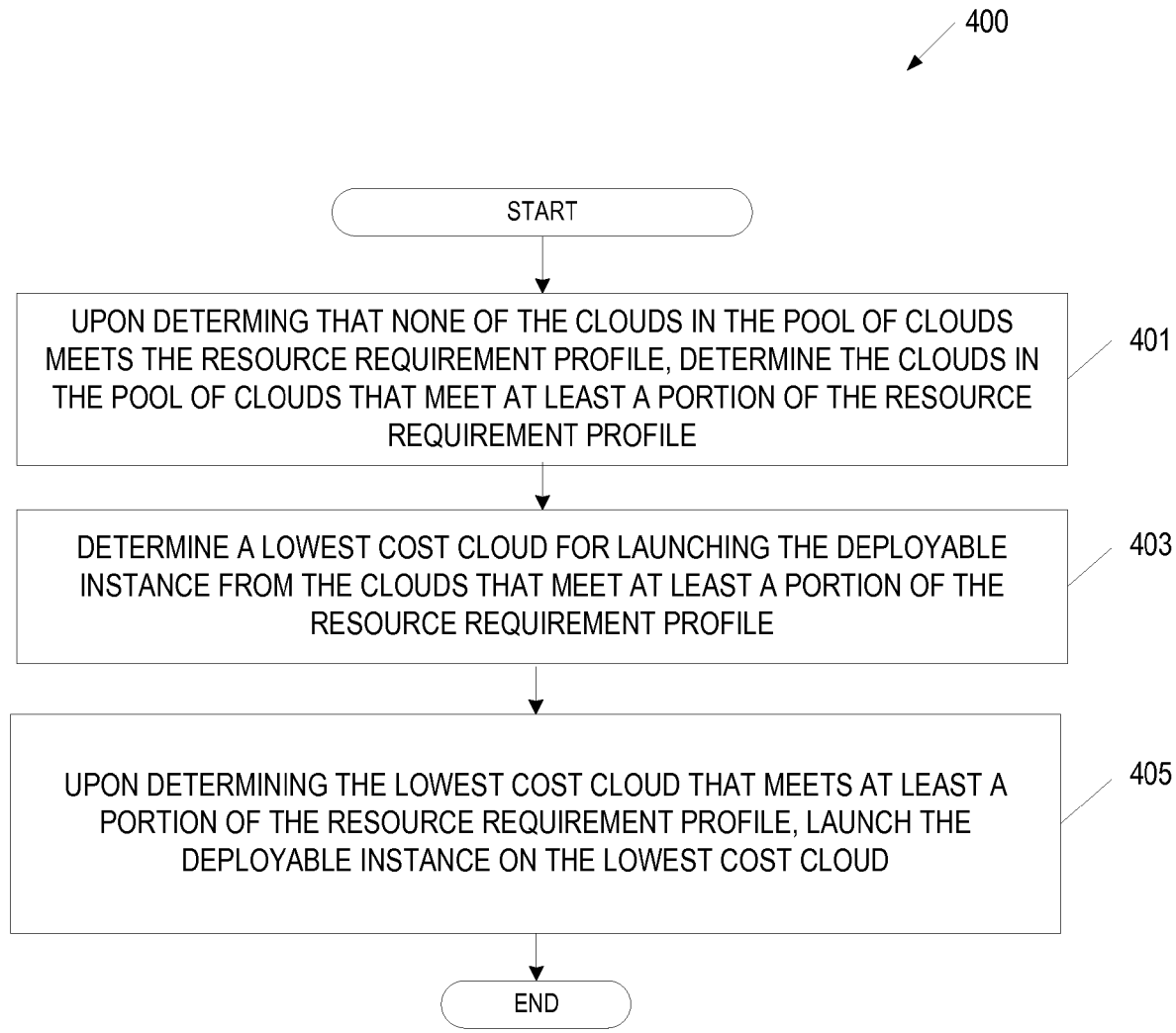
FIG. 4 is a flow diagram illustrating another embodiment of a method of cloud provider selection.

FIG. 4 is a flow diagram of an embodiment of a method 400 for cloud provider selection. The method 400 is performed by processing logic that may comprise hardware (circuitry, dedicated logic, etc.), software (such as is run on a general purpose computer system or a dedicated machine), or a combination of both. In one embodiment, the method 400 is performed by the selection server 200 of FIG. 2.

At block 401, upon determining that none of the clouds in the pool of potential clouds meets the resource requirement profile, the selection server determines clouds in the pool of clouds that meet at least a portion of the resource requirement profile. For example, the selection server can determine clouds that meet a certain number (or percentage) of requirements in the resource requirement profile. In another example, the selection server can determine clouds that meet certain designated requirements (or minimum requirements) in the resource requirement profile. In one example, when it is determined that no matching cloud is available, then the user is informed that there is no suitable cloud available.

At block 403, the selection server determines a lowest cost cloud that meets at least the portion of the resource requirement profile for launching the deployable instance from the cloud. As previously described, the selection server can determine a cost for launching the deployable instance in each of the clouds based on the requirements of the resource requirement profile. In one embodiment, the costs for each cloud are based only on the portion of the requirements of the resource requirement profile that are actually met by that cloud.

At block 405, upon determining the lowest cost cloud that meets at least the portion of the resource requirement profile, the deployable instance is launched on the lowest cost cloud that meets the at least a portion of the resource requirement profile.

In other embodiments, the selection server determines a best match with a lowest cost cloud. For example, the resource requirement profile for the deployable instance can include ranking criteria that include parameters such as cost, performance, reliability, internal versus external cloud provider, provider type, provider capacity, and/or date/time of deployment. The user or administrator can rank the parameters to indicate which parameters are more important than others for determining a best match. For example, clouds with an associated cost in a certain range may be ranked higher than clouds with capacity in a certain range. In one embodiment, the clouds may be given a score based on the ranking criteria, such as a cost parameter where the user could specify that cloud providers with costs in a certain range receive a certain score. In one example, the minimum requirement for cost is that the cloud providers should not cost more than X dollars per unit of time.

In one example, if the amount of network bandwidth that a deployable instance will consume is known because a deployment is for a streaming media server, then costs can minimized by only launching that deployment in a "low cost bandwidth" cloud provider.

In one embodiment, administrators may enter cost information themselves or the cost data may be automatically entered, e.g., from a cloud provider. In one embodiment, the cloud provider's application programming interface (API) exports cost information.

Figure 5:
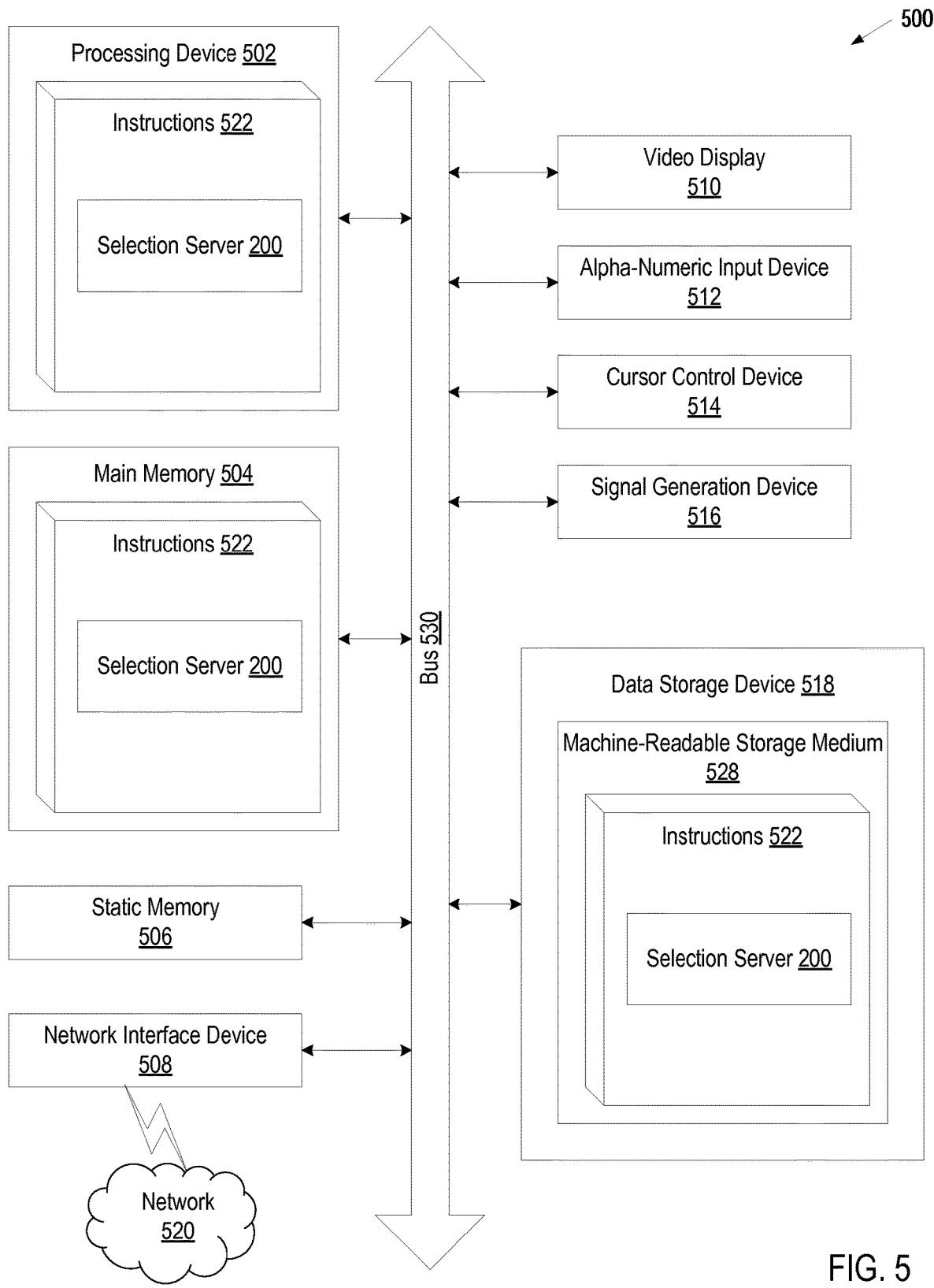
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a selection server (e.g., selection server 200 of FIG. 2), an agent, and/or a software library containing methods that call a selection server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request to launch a deployable instance and a resource requirement profile for the deployable instance, wherein the deployable instance specifies an application and a number of virtual machines that are to be used to provide the application, and wherein the resource requirement profile specifies ranking criteria;
receiving cost model information for each cloud in a pool of clouds, wherein different cost information is received for different clouds, and wherein a respective cost model information for a respective cloud in the pool of clouds is in view of whether the respective cloud includes a first additional cost for a network address assignment for the deployable instance, whether the respective cloud includes a second additional cost for a backup associated with the deployable instance, and an identification of a peak usage period of each respective cloud;
receiving capability information for each cloud in the pool of clouds, wherein different capability information is received for the different clouds; and
responsive to identifying selectable clouds in the pool of clouds that meet the resource requirement profile of the deployable instance:
calculating a deployment cost for the deployable instance for each of the selectable clouds in the pool of clouds by using the resource requirement profile for the deployable instance, the cost model information, and a hosting capacity for each cloud in the pool of clouds, the cost model information being associated with a combination of an available period of time to provide the deployable instance and resources of the respective cloud in the pool of clouds to provide the deployable instance for the available period of time;
ranking the selectable clouds based on the ranking criteria and the deployment cost for each of the selectable clouds to determine a priority ranking for each of the selectable clouds;
determining, by a processing device, a lowest cost cloud that corresponds to the resource requirement profile for launching the deployable instance from the selectable clouds in view of the priority ranking for each of the selectable clouds; and
upon determining the lowest cost cloud that meets the resource requirement profile, launching the deployable instance on the lowest cost cloud that corresponds to the resource requirement profile.

2. The method of claim 1, further comprising:
responsive to failing to identify clouds in the pool of clouds that meet the resource requirement profile of the deployable instance:
determining alternative clouds in the pool of clouds that meet at least a portion of the resource requirement profile;
determining another lowest cost cloud that meets the at least a portion of the resource requirement profile for launching the deployable instance from the alternative clouds in view of the deployment cost for each of the alternative clouds; and
upon determining the another lowest cost cloud that meets the at least a portion of the resource requirement profile, launching the deployable instance on the another lowest cost cloud.

3. The method of claim 1, wherein the cost model information is further associated with a reliability of the respective cloud and whether the respective cloud includes a first cost for a partial portion of a specified amount of time or includes a second cost for a full portion of the specified amount of time.

4. The method of claim 1, wherein the cost model information is in view of one or more chargeables.

5. The method of claim 4, wherein the one or more chargeables are selected from one or more of a first unit of run time, a second unit of usage of bandwidth, a unit of usage of storage, a load balancer, or a database access.

6. The method of claim 4, wherein one or more first chargeables of a first cloud in the pool of clouds are different from one or more second chargeables of a second cloud in the pool of clouds.

7. The method of claim 1, wherein receiving the cost model information comprises receiving the respective cost model information from each cloud in the pool of clouds.

8. A system comprising:
a memory; and
a processing device, operatively coupled with the memory, to:
receive a request to launch a deployable instance and a resource requirement profile for the deployable instance, wherein the deployable instance specifies an application and a number of virtual machines that are to be used to provide the application, and wherein the resource requirement profile specifies ranking criteria;
receive cost model information for each cloud in a pool of clouds, wherein different cost information is received for different clouds, and wherein a respective cost model information for a respective cloud in the pool of clouds is in view of whether the respective cloud includes a first additional cost for a network address assignment for the deployable instance, whether the respective cloud includes a second additional cost for a backup associated with the deployable instance, and an identification of a peak usage period of each respective cloud;
receive capability information for each cloud in the pool of clouds, wherein different capability information is received for the different clouds; and
responsive to identifying selectable clouds in the pool of clouds that meet the resource requirement profile of the deployable instance:
calculate a deployment cost for the deployable instance for each cloud in the pool of clouds by using the resource requirement profile for the deployable instance, the cost model information, and a hosting capacity for each cloud in the pool of clouds, the cost model information being associated with a combination of an available period of time to provide the deployable instance and resources of the respective cloud in the pool of clouds to provide the deployable instance for the available period of time;
rank the selectable clouds based on the ranking criteria and the deployment cost for each of the selectable clouds to determine a priority ranking for each of the selectable clouds;
determine a lowest cost cloud that corresponds to the resource requirement profile for launching the deployable instance from the selectable clouds in view of the priority ranking for each of the selectable clouds; and
upon determining the lowest cost cloud that meets the resource requirement profile, launch the deployable instance on the lowest cost cloud that corresponds to the resource requirement profile.

9. The system of claim 8, wherein responsive to failing to identify clouds in the pool of clouds that meet the resource requirement profile of the deployable instance, the processing device is to:
determine alternative clouds in the pool of clouds that meet at least a portion of the resource requirement profile;
determine another lowest cost cloud that meets the at least a portion of the resource requirement profile for launching the deployable instance from the alternative clouds in view of the deployment cost for each of the alternative clouds; and
upon determining the another lowest cost cloud that meets the at least a portion of the resource requirement profile, launch the deployable instance on the another lowest cost cloud.

10. The system of claim 9, wherein the at least a portion of the resource requirement profile is a minimum resource requirement profile.

11. The system of claim 8, wherein the cost model information is in view of one or more chargeables.

12. The system of claim 11, wherein the one or more chargeables are selected from one or more of a first unit of run time, a second unit of usage of bandwidth, a unit of usage of storage, a load balancer, or a database access.

13. The system of claim 11, wherein one or more first chargeables of a first cloud in the pool of clouds are different from one or more second chargeables of a second cloud in the pool of clouds.

14. The system of claim 8, wherein to receive the cost model information, the processing device is to receive the respective cost model information from each cloud in the pool of clouds.

15. A non-transitory computer-readable storage medium comprising instructions that, when executed by a processing device, cause the processing device to:
receive a request to launch a deployable instance and a resource requirement profile for the deployable instance, wherein the deployable instance specifies an application and a number of virtual machines that are to be used to provide the application, and wherein the resource requirement profile specifies ranking criteria;
receive cost model information for each cloud in a pool of clouds, wherein different cost information is received for different clouds, and wherein a respective cost model information for a respective cloud in the pool of clouds is in view of whether the respective cloud includes a first additional cost for a network address assignment for the deployable instance, whether the respective cloud includes a second additional cost for a backup associated with the deployable instance, and an identification of a peak usage period of each respective cloud;
receive capability information for each cloud in the pool of clouds, wherein different capability information is received for the different clouds;
responsive to identifying selectable clouds in the pool of clouds that meet the resource requirement profile of the deployable instance:
calculate a deployment cost for the deployable instance for each cloud in the pool of clouds by using the resource requirement profile for the deployable instance, the cost model information, and a hosting capacity for each cloud in the pool of clouds, the cost model information being associated with a combination of an available period of time to provide the deployable instance and resources of the respective cloud in the pool of clouds to provide the deployable instance for the available period of time;
rank the selectable clouds based on the ranking criteria and the deployment cost for each of the selectable clouds to determine a priority ranking for each of the selectable clouds;

determine, by the processing device, a lowest cost cloud that corresponds to the resource requirement profile for launching the deployable instance from the selectable clouds in view of the priority ranking for each of the selectable clouds; and upon determining the lowest cost cloud that meets the resource requirement profile, launch the deployable instance on the lowest cost cloud that corresponds to the resource requirement profile.

16. The non-transitory computer-readable storage medium of claim 15, wherein responsive to failing to identify clouds in the pool of clouds that meet the resource requirement profile of the deployable instance, the processing device is to:

determine alternative clouds in the pool of clouds that meet at least a portion of the resource requirement profile;

determine another lowest cost cloud that meets the at least a portion of the resource requirement profile for launching the deployable instance from the alternative clouds in view of the deployment cost for each of the alternative clouds; and upon determining the another lowest cost cloud that meets the at least a portion of the resource requirement profile, launch the deployable instance on the another lowest cost cloud.

17. The non-transitory computer-readable storage medium of claim 16, wherein the at least a portion of the resource requirement profile is a minimum resource requirement profile.

18. The non-transitory computer-readable storage medium of claim 15, wherein the cost model information is in view of one or more chargeables.

19. The non-transitory computer-readable storage medium of claim 18, wherein the one or more chargeables are selected from one or more of a first unit of run time, a second unit of usage of bandwidth, a unit of usage of storage, a load balancer, or a database access.

20. The non-transitory computer-readable storage medium of claim 18, wherein one or more first chargeables of a first cloud in the pool of clouds are different from one or more second chargeables of a second cloud in the pool of clouds.

\* \* \* \* \*